United States Patent [19]

Hiraguri

[11] Patent Number: 4,528,605

[45] Date of Patent: Jul. 9, 1985

[54] ROTARY MAGNETIC HEAD SCANNING CONTROL SYSTEM IN A MAGNETIC RECORDING AND REPRODUCING APPARATUS

[75] Inventor: Seisuke Hiraguri, Yokohama, Japan

[73] Assignee: Victor Company of Japan, Ltd., Yokohama, Japan

[21] Appl. No.: 465,466

[22] Filed: Feb. 10, 1983

[30] Foreign Application Priority Data

Feb. 13, 1982 [JP] Japan ................................. 57-21849
Feb. 13, 1982 [JP] Japan ................................. 57-21850

[51] Int. Cl.$^3$ .............................................. G11B 5/58
[52] U.S. Cl. ..................................................... 360/77
[58] Field of Search ....................... 360/10.2, 10.3, 77, 360/78

[56] References Cited

U.S. PATENT DOCUMENTS

4,120,008 10/1978 Metzger et al. ........................ 360/70
4,237,500 12/1980 Sanderson ............................. 360/77

FOREIGN PATENT DOCUMENTS

2364581 7/1978 France .
2438888 9/1980 France .
2068599 12/1981 United Kingdom .

OTHER PUBLICATIONS

Funkschau. vol. 51, No. 16, Aug. 1979, Munich (DE), pp. 72-76, (926-930), "Video 2000-ein neues Bildanfzeichnungs system".
Patent Abstracts of Japan, vol. 3, No. 44 (E-104), Apr. 14, 1979, p. 14E & JP-A-54 21 809.

Primary Examiner—George G. Stellar
Attorney, Agent, or Firm—Louis Bernat

[57] ABSTRACT

A rotary magnetic head scanning control system in a magnetic recording and reproducing apparatus comprising a plurality of rotary magnetic heads and a head height position control mechanism, comprises a pilot signal generating circuit for generating a pilot signal during a recording mode, a circuit for controlling interruption of application of the pilot signal and a recording signal to each of the rotary magnetic heads, so that the pilot signal is supplied to one of the rotary magnetic heads together with the recording signal for a predetermined interval to record the pilot signal and the recording signal and thereafter interrupt application of the recording signal to the one rotary magnetic head to put the one rotary magnetic head into a reproducing state, and application of a recording signal to another rotary magnetic head is interrupted during a predetermined interval in which the other rotary magnetic head scans over a track part adjacent to a track part recorded with the pilot signal of a recorded track formed by the one rotary magnetic head to put the other rotary magnetic head in a reproducing state and thereafter supply the pilot signal to the other rotary magnetic head together with the recording signal for a predetermined interval to record the pilot signal and the recording signal, and a circuit for obtaining a control signal to be applied to the head height position control mechanism from the pilot signal reproduced as crosstalk from a track part adjacent to a scanning track, to apply the control signal thus obtained to the head height position control means and control the height positions of each of the rotary magnetic heads to become the same.

6 Claims, 13 Drawing Figures

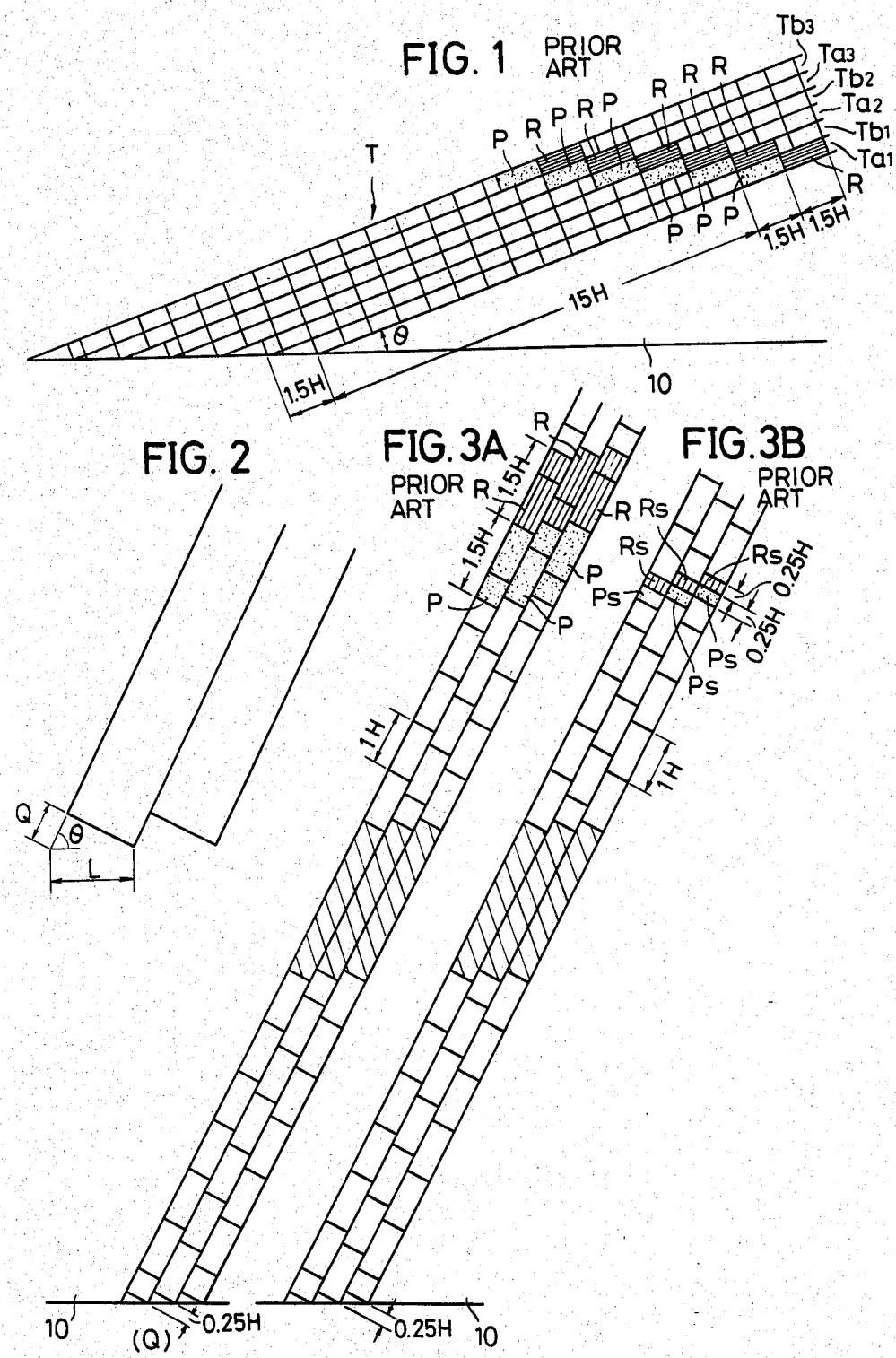

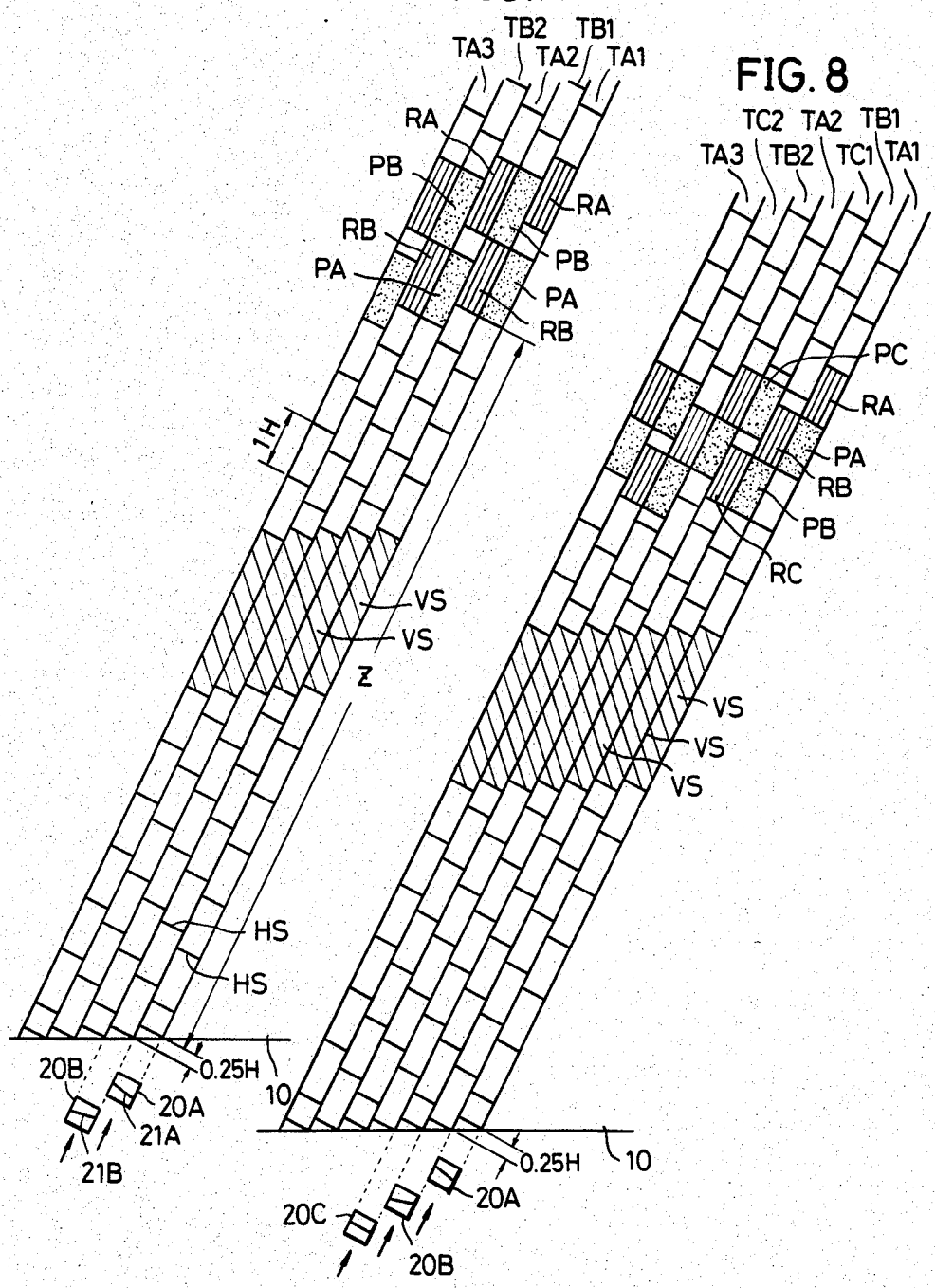

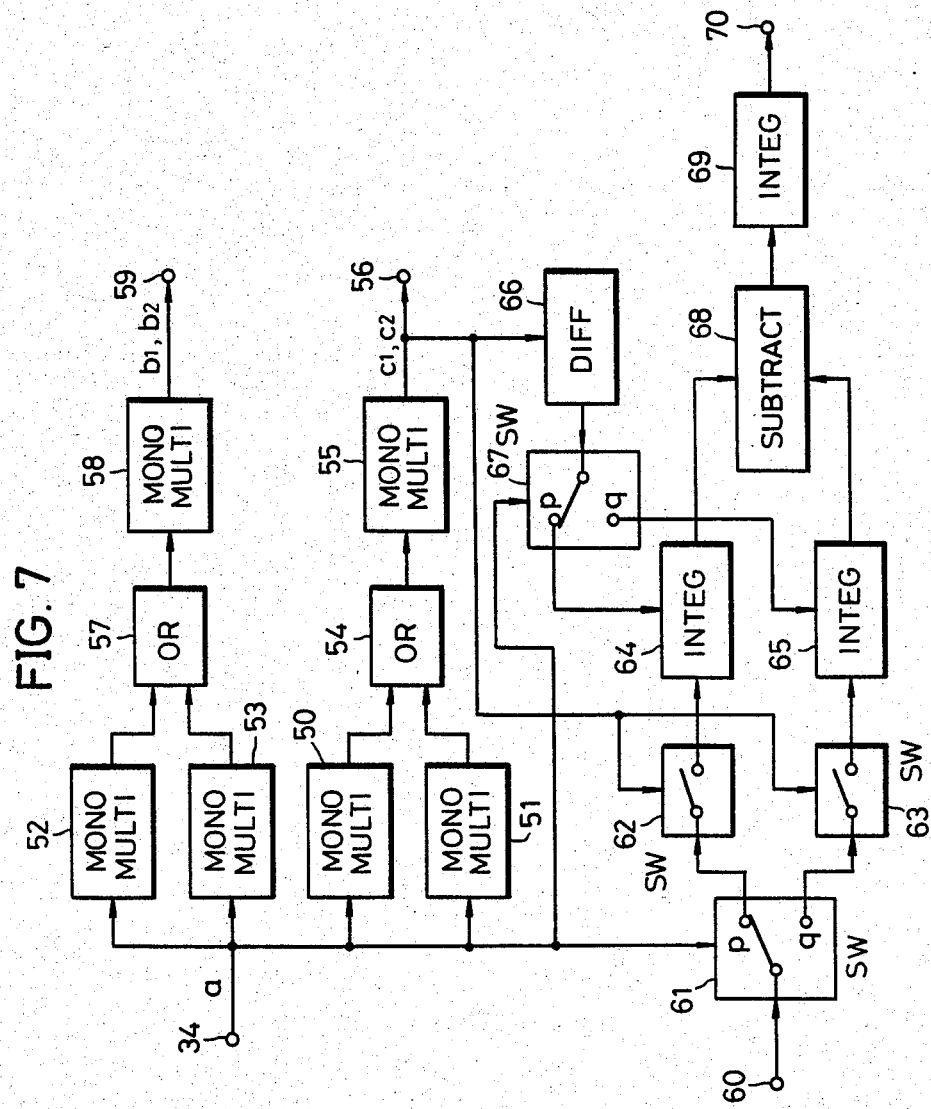

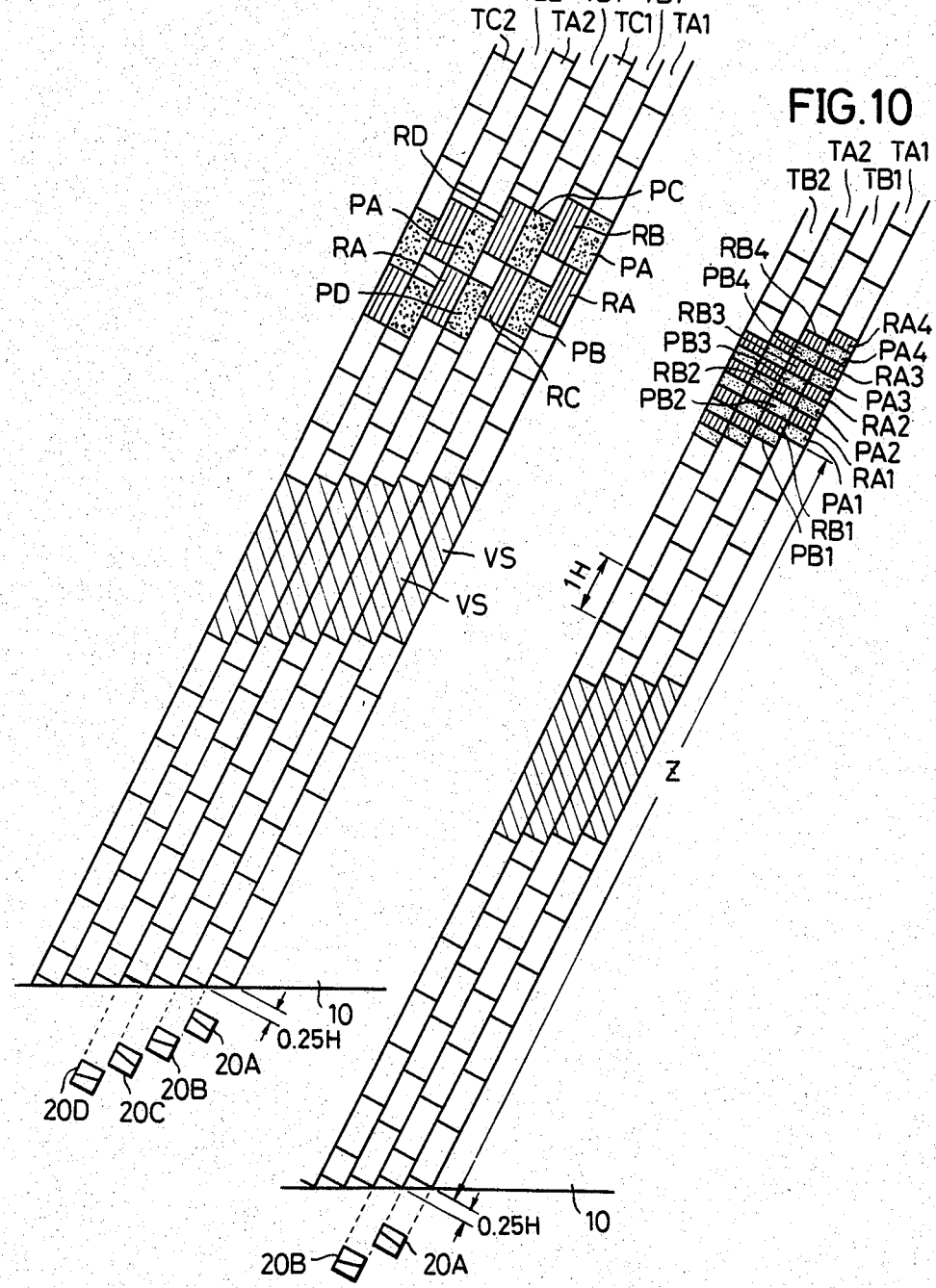

ROTARY MAGNETIC HEAD SCANNING CONTROL SYSTEM IN A MAGNETIC RECORDING AND REPRODUCING APPARATUS

BACKGROUND OF THE INVENTION

The present invention generally relates to rotary magnetic head scanning control systems in magnetic recording and reproducing apparatuses, and more particularly to a rotary magnetic head scanning control system in a magnetic recording and reproducing apparatus which comprises means for varying height positions of rotary magnetic heads so that the rotary magnetic heads accurately scan over recorded tracks during a reproducing mode, designed to control the head scanning by controlling relative height positions of respective rotary heads to become the same during a recording mode. The head scanning control system according to the present invention can positively control the scanning of the rotary magnetic heads during the recording mode, even if a format employed carries out recording and reproduction with a slow magnetic tape traveling speed and with a track pattern in which the track pitch and the track width are small.

Recently, in magnetic recording and reproducing apparatuses for home use (hereinafter simply referred to as a home VTR) having helical scanning type rotary heads, high density recording and reproduction are becoming possible due to improvements in the magnetic tape and the realization of high density rotary heads. Accordingly, home VTRs have been manufactured which are capable of carrying out recording and reproduction of durations longer than those of conventional VTRs, by reducing the tape traveling speed, the track pitch, and the like. However, because a tape driving system in the home VTR has a simplified construction in order to reduce the cost of the apparatus, it becomes difficult to accurately and stably maintain a desired tracking accuracy by scanning over bends in video tracks, during the high density recording and reproduction. Especially during a so-called interchanged reproduction in which a magnetic tape recorded by one home VTR is reproduced by another home VTR, it becomes difficult to stably maintain the above desired tracking accuracy, and a high quality picture cannot be obtained.

Hence, as a method of solve the problems with respect to the tracking introduced during the high density recording and reproduction, and eliminate noise bar introduced during a special reproduction mode such as a slow-motion reproduction mode, still reproduction mode, and quick-motion reproduction mode in which reproduction is carried out with a tape traveling speed which is different from the tape traveling speed upon recording, that is, to eliminate the noise bar introduced because the rotary heads do not accurately scan over the recorded tracks in the conventional VTR, a head moving mechanism is provided in the home VTRs which are recently being reduced to practice. The head moving mechanism displaces the rotary heads in a direction perpendicular to a rotating plane of the rotary heads, and displaces the rotary heads in a direction perpendicular to the track longitudinal direction, that is, along the width direction of the track.

According to a tracking control system employing the above described head moving mechanism, tracking control is carried out so that the rotary heads accurately scan over the recorded tracks, and as a result, a fine reproduction can be carried out. However, at a terminating point of the reproduction accompanying the above tracking control, the relative height positions of the plurality of rotary heads are not necessarily the same. In addition, if a piezo-ceramic material and the like, for example, is used for the head moving mechanism, the rotary heads do not return perfectly to their neutral positions even when application of a control voltage is stopped at the terminating point of the reproducing mode, because the piezo-ceramic material generally accompanies hysteresis. As a result, the relative height positions of each of the rotary heads do not become the same.

If each of the rotary heads are not at the same height position during the recording mode, side edges of formed tracks may overlap. Moreover, gaps may be formed between tracks, and form an unrecorded bands. Hence, as will be described hereinafter in conjunction with the drawings, the conventional apparatus recorded a pilot signal for head scan control during a predetermined interval during the recording mode, and set the mode to the reproducing mode during a succeeding predetermined interval. A crosstalk component of the pilot signal previously recorded on the adjacent track is reproduced during this reproducing mode during the succeeding predetermined interval. A control signal is obtained from this reproduced crosstalk component, and the height position of one head was controlled to become the same as the height position of another head by use of the control signal.

However, if the magnetic tape traveling speed and the track pitch are reduced to downsize the VTR and carry out recording with respect to the magnetic tape with a higher density, the so-called H-shift (shift in horizontal scanning periods) among adjacent tracks becomes small as will be described hereinafter. Thus, even if the mode is temporarily set to the reproducing mode during the recording mode to reproduce the pilot signal recorded on the adjacent track as crosstalk, the reproducing period is too short to positively reproduce the pilot signal. Therefore, there was a disadvantage in that a positive head scan control could not be carried out.

SUMMARY OF THE INVENTION

Accordingly, it is a general object of the present invention to provide a novel and useful rotary magnetic head scan control system in a magnetic recording and reproducing apparatus, in which the above described disadvantages have been overcome.

Another and more specific object of the present invention is to provide a rotary magnetic head scan control system in which a pilot signal is recorded and reproduced so that there at least is a part where the pilot signal is recorded and then reproduced on one track, and the pilot signal recorded on the previous track is reproduced as crosstalk on a succeeding track before the pilot signal is recorded on that succeeding track. According to the system of the present invention, the control of the magnetic head scan during a recording mode is carried out by using a control signal obtained from the reproduced signal.

Still another object of the present invention is to provide a rotary magnetic head scan control system in which the pilot signal is recorded and then reproduced on one track, and the pilot signal recorded on the previous track is reproduced as crosstalk on a succeeding track before the pilot signal is recorded on that succeeding track, and these operations are alternately repeated for each track. The control of the magnetic head scan during a recording mode is carried out by using a control signal obtained from the reproduced signal.

Another object of the present invention is to provide a rotary magnetic head scan control system a plurality of recording interval parts and reproducing interval parts of the pilot signal is repeatedly provided for each track, and the pilot signal is recorded and reproduced so that the plurality of recording interval parts on one track are adjacent to the plurality of reproducing intervals parts on an adjacent track among adjacent tracks. The control of the magnetic head scan during a recording mode is carried out by using a control signal obtained from the reproduced signal.

Other objects and further features of the present invention will be apparent from the following detailed description when read in conjunction with the accompanying drawings.

BRIEF DESCRIPTION OF THE DRAWINGS

FIG. 1 shows a track pattern for explaining a conventional rotary magnetic head scan control system;

FIG. 2 is a diagram for explaining the magnitude of tracking error on the track pattern;

FIGS. 3A and 3B respectively show track patterns in which the magnetic tape traveling speed and the track pitch are reduced in the conventional system;

FIG. 4 shows a track pattern obtained by a first embodiment of a rotary magnetic head scan control system according to the present invention;

FIG. 7 is a diagram for explaining the operations of a micro-computer shown in FIG. 5 for realizing the first embodiment of the system according to the present invention, by replacing the operations of the micro-computer by equivalent block systems;

FIG. 8 shows a track pattern obtained by a second embodiment of a rotary magnetic head scan control system according to the present invention;

FIG. 9 shows a track pattern obtained by a third embodiment of a rotary magnetic head scan control system according to the present invention;

FIG. 10 shows a track pattern obtained by a fourth embodiment of a rotary magnetic head scan control system according to the present invention;

DETAILED DESCRIPTION

Figure 5:
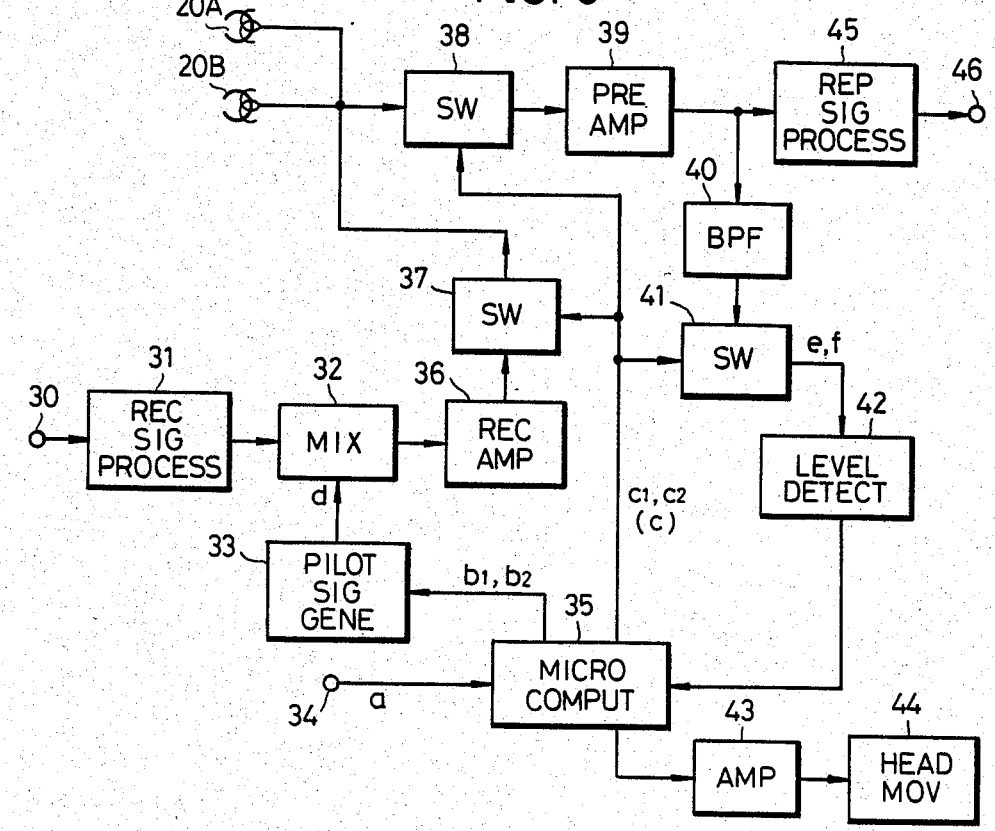
FIG. 5 is a systematic block diagram showing an embodiment of a block system for realizing the system according to the present invention.

First, description will be given with respect to a conventional system by referring to FIG. 1. A magnetic tape 10 travels at a speed of 2.44 cm/sec, for example, and a pair of rotary magnetic heads (not shown) alternately scan over the traveling tape 10 to form tracks T formed obliquely with respect to the longitudinal direction of the tape 10 with an angle $\theta$, with a track pitch of 22.6 μm. Tracks Ta1, Ta2, Ta3, ... are formed by a first rotary magnetic head (hereinafter referred to as the first head), and tracks Tb1, Tb2, Tb3, ... are formed by a second rotary magnetic head (hereinafter referred to as the second head). These tracks Ta1, Ta2, Ta3, ... and tracks Tb1, Tb2, Tb3, ... are alternately formed by the first and second heads. Gaps of the first and second heads have azimuth angles in mutually opposite directions, for example, and each of the tracks are formed in contiguous contact with each other. During the reproducing mode, a pilot signal used for tracking control is multiplexed with a video signal which is to be recorded, and recorded on each of the tracks in a frequency band lower than the frequency band of the video signal.

Various known tracking control methods may be used during the reproducing mode, and detailed description thereof will be omitted. As one example, four kinds of pilot signals having different frequencies are used, and one kind of pilot signal is recorded on one track and pilot signals of different kinds are recorded for each track. Because the frequencies of these pilot signals are low, these pilot signals are hardly affected by the azimuth loss of the heads, and the crosstalk component of the pilot signal recorded on the adjacent track is accordingly reproduced. A control signal is formed according to the difference in frequency, level, and the like of the reproduced crosstalk components, and the tracking control is carried out during the reproducing mode by use of this control signal.

Because each track is formed obliquely with respect to the longitudinal direction of the tape 10, a shift in distance corresponding to 1.5H (H indicates one horizontal scanning period) along the longitudinal direction of the track is introduced between a starting end of one track and a starting end of the adjacent track, that is, the so-called H-shift occurs. The first and second heads respectively record a pilot signal for recording mode head scanning control (having a frequency 222.950 kHz, for example) at a track part P which is separated from the starting end of one track by a distance corresponding to 15H, for example, for an interval 1.5H. When the heads scan over a track part R during a succeeding interval 1.5H, the heads assume a reproducing state. Thereafter, the recording of the video signal and the pilot signal for reproducing mode is continuously carried out.

The track part R whereat the heads assume the reproducing state, is always adjacent to the track part P of the adjacent track formed previously whereat the pilot signal is recorded. Accordingly, when one head assumes the reproducing state and scans over the track part R, the crosstalk component of the pilot signal is reproduced from the adjacent track part P. The control signal is formed according to this reproduced signal, and this control signal is applied to a head moving mechanism to carry out control so that the relative height positions of the two heads become the same. Therefore, the side edges of the tracks do not overlap and gaps are not formed between the tracks during the recording mode, and each of the tracks are formed in contiguous contact with each other.

As shown in FIG. 2, the following relationships stand if an H-shift quantity between adjacent tracks is designated by Q, angle formed between the longitudinal direction of the track and the longitudinal direction of the magnetic tape by $\theta$, distance over which the magnetic tape travels while the head scans one track by L (m), traveling speed of the magnetic tape by V (m/sec), number of horizontal scanning periods H recorded on one track by N, recording time of one track by S (sec), and length of one track by K.

$$Q \approx (N \cdot L \cdot \cos \theta)/K \quad (1)$$

$$L \approx V \cdot S \quad (2)$$

If the traveling speed V of the tape is reduced in order to increase the number of tracks per predetermined length of tape and increase the recording and reproducing time, the distance L becomes small as seen from equation (2), and it becomes possible to reduce the track pitch. However, when the distance L becomes small, the H-shift quantity Q becomes small as seen from equation (1). On the other hand, the angle $\theta$ becomes small if the traveling speed V is reduced, however, the rate with which the angle $\theta$ decreases is lower than the rate with which the distance L decreases. Accordingly, the magnitude of the H-shift quantity Q is substantially determined according to the magnitude of the distance L.

For example, if the tape traveling speed is set in the range of 22% of the tape traveling speed for the case shown in FIG. 1 and the track pitch is set equal to 5 $\mu$m, the H-shift quantity Q becomes equal to 0.25H as shown in FIG. 3A. Hence, during the recording mode, each head records the pilot signal at the track part P for a distance corresponding to 1.5H on each of the respective tracks and the head is in the reproducing state at the succeeding track part R for a distance corresponding to 1.5H, however, the interval in which the head can reproduce the crosstalk component of the pilot signal recorded on the adjacent track while scanning over the track part R is only 0.25H. Thus, even if the lengths of the track parts P and R are respectively set equal to distances corresponding to 1.5H as in the case shown in FIG. 1, the interval other than the 0.25H interval in which the crosstalk component of the pilot signal recorded on the adjacent track is wasted. As a result, even if lengths of a recording track part Ps and a reproducing track part Rs are respectively set equal to a distance corresponding to 0.25H as shown in FIG. 3B, the interval in which the crosstalk component of the pilot signal recorded on the adjacent track can be reproduced becomes the same as in the case shown in FIG. 3A.

When the recording and reproduction are carried out under a slow tape traveling speed and the track width and the track pitch are set small, the H-shift quantity Q becomes small. Hence, among adjacent tracks, the length over which the track parts P and R are adjacent to each other becomes short, and the interval in which the crosstalk component of the pilot signal recorded on the adjacent track can be reproduced becomes short. For this reason, the crosstalk component of the pilot signal recorded on the adjacent track cannot be reproduced positively, and the reproduction of this crosstalk component is easily affected by dropout and the like. Therefore, there was a disadvantage in that the head scan could not be controlled accurately during the recording mode.

The present invention has overcome the above described disadvantages, and description will hereinafter be given with respect to each embodiment of the invention by referring to FIG. 4 and the succeeding figures.

FIG. 4 shows a track pattern obtained according to a first embodiment of a system of the present invention. During the recording mode, tracks TA1, TA2, TA3, ... formed by a first rotary magnetic head (first head) 20A and tracks TB1, TB2, ... formed by a second rotary magnetic head (second head) 20B are alternately formed on the magnetic tape 10. Each of the tracks are in contiguous contact with the adjacent tracks. The H-shift quantity Q among adjacent tracks is equal to 0.25H in the present embodiment. Gaps 21A and 21B of the first and second heads 20A and 20B comprise azimuth angles in mutually opposite directions. Horizontal synchronizing signal parts HS recorded on the tracks TA1, TA2, ... and tracks TB1, TB2, ... are respectively recorded with the azimuth angles inclined in mutually opposite directions, however, the horizontal synchronizing signal parts HS are shown as lines along the width direction of each track for convenience's sake. In addition, an audio signal track, a control signal track, and the like are formed along the side edges in the longitudinal direction of the magnetic tape 10, however, these tracks are omitted and not shown in FIG. 4.

When forming the tracks TA1, TA2, ... by the first head 20A, the pilot signal is recorded at a track part PA throughout an interval 1.25H after a predetermined interval Z has elapsed from a starting end of the track. Next, after leaving an interval 0.5H, the first head 20A assumes the reproducing state at a track part RA throughout an interval 1.25H. On the other hand, when forming the tracks TB1, TB2, ... by the second head 20B, the second head 20B assumes the reproducing state at a track part RB throughout an interval 1.25H, after another predetermined interval (Z+0.25H) has elapsed from the starting end of the track. Then, the second head 20B records the pilot signal at a track part PB throughout an interval 1.25H. The starting end position of the track part PB is separated from the starting end of the track by a distance corresponding to (Z+1.5H) along the longitudinal direction of the track. As described above, the forming of tracks which accompany recording and reproduction of the pilot signal are alternately carried out by the first and second heads 20A and 20B.

Accordingly, when the second head 20B forms the track TB1, for example, the second head 20B reproduces the pilot signal recorded on the track part PA of the adjacent track TA1 as crosstalk while scanning over the track part RB. Similarly, when the first head 20A forms the track TA2, the first head 20A reproduces the pilot signal recorded on the track part PB of the adjacent track TB1 as crosstalk while scanning over the track part RA. These operations are similarly repeated with respect to the other tracks.

According to the present embodiment, the first head 20A carries out the recording and reproduction of the pilot signal in the sequence described above, while the second head 20B carries out the reproduction and recording of the pilot signal is the sequence described above. Hence, although the H-shift quantity is small and equal to 0.25H, the pilot signal recorded track parts PA and PB and the reproducing track parts RB and RA respectively become perfectly aligned side-by-side along their entire lengths (distance corresponding to 1.25H). As a result, the first and second heads 20A and 20B can positively and effectively reproduce the pilot signals recorded on the track parts PA and PB as crosstalk, throughout the entire lengths of the track parts RB and RA.

In FIG. 4, parts VS indicated by oblique lines indicate track parts where vertical synchronizing signals of the video signal are recorded. Because no signals are recorded on the track parts RA and RB, it is desirable to position these track parts RA and RB so that the reproduced picture is not greatly affected by reproducing these track parts. For example, it is desirable to position these track parts RA and RB at positions separated by more than 2H to 3H from the vertical synchronizing signal recorded parts VS, and further, it is desirable to position the track parts RA and RB within vertical blanking periods of the video signal.

Next, description will be given with respect to an embodiment of a circuit system for recording and reproducing the pilot signal in the manner described heretofore in conjunction with FIG. 4, by referring to FIG. 5. In FIG. 5, a composite video signal to be recorded is supplied to a recording signal processing circuit 31 through an input terminal 30. The composite video signal is subjected to signal processing at the recording signal processing circuit 31, and formed into a signal having a known signal format suited for magnetic recording. As one example of such a signal processing, luminance and chrominance signals are separated from the composite video signal, the separated luminance signal is frequency-modulated, the separated chrominance signal is frequency-converted into a band lower than the band of the frequency modulated luminance signal, and the frequency modulated luminance signal and the frequency converted chrominance signal are then multiplexed. An output signal of the recording signal processing circuit 31 is supplied to a mixing circuit 32, and mixed with a pilot signal having a constant amplitude which is obtained from a pilot signal generator 33.

Figure 6:
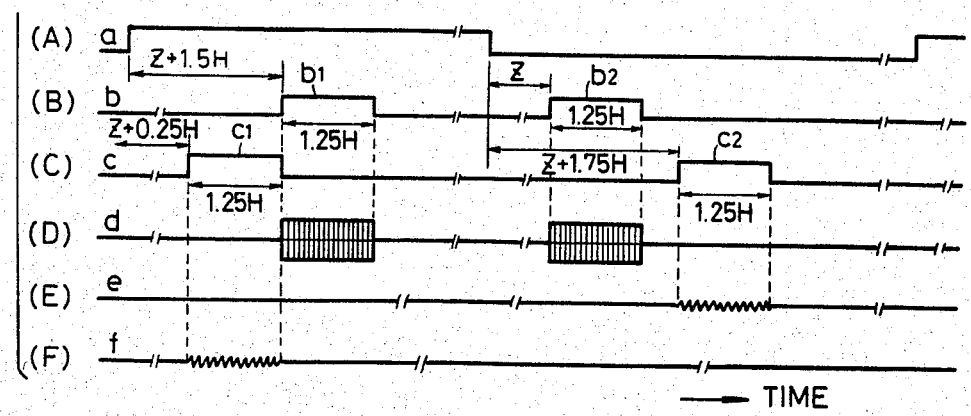
FIGS. 6(A) through 6(F) are graphs respectively showing signal waveforms at each part of a block system shown in FIG. 5 for realizing the first embodiment of the system according to the present invention.

A drum pulse a shown in FIG. 6(A) which is in synchronism with the rotation of the first and second heads 20A and 20B, is supplied to a micro-computer 35 through a terminal 34. For example, this drum pulse a is obtained from a rotation detecting device comprising a detecting head which cooperates with a rotary drum which has the heads 20A and 20B provided at diametrical positions thereof, where the detecting head is mounted to a rotary shaft of a motor for rotating the rotary drum. The drum pulse a is a signal which assumes high level during one-half revolution (1/60 second) of the heads 20A and 20B and assumes low level during the other one-half revolution (1/60 second) of the heads 20A and 20B. In FIGS. 6(A) through 6(F), a part along the time base is cut away and omitted because of the limited space available on the paper.

As shown in FIG. 6(B), the micro-computer 35 generates a pulse series b comprising a pulse b1 having a pulse width 1.25H which rises after an interval (Z+1.5H) elapses from the rise in the drum pulse a, and a pulse b2 having a pulse width 1.25H which rises after an interval Z elapses from the fall in the drum pulse a. This pulse series b from the micro-computer 35 is supplied to the pilot signal generator 33. The pilot signal generator 33 generates a pilot signal d shown in FIG. 6(D) having a single frequency (222.950 kHz, for example) and a constant amplitude, only during an interval in which the pulses b1 and b2 from the micro-computer 35 is applied thereto. The pilot signal generated by the pilot signal generator 33 is supplied to the mixing circuit 32. A recording video signal multiplexed with the pilot signal d at the mixing circuit 32, is amplified at a recording amplifier 36 and then supplied to a switching circuit 37.

The micro-computer 35 also generates a pulse series c shown in FIG. 6(C) comprising a pulse c1 having a pulse width 1.25H which rises after elapse of an interval (Z+0.25H) from the rise in the drum pulse a, and a pulse c2 having a pulse width 1.25H which rises after elapse of an interval (Z+1.75H) from the fall in the drum pulse a, in addition to generating the pulse series b. This pulse series c from the micro-computer 35 is supplied to switching circuits 37, 38, and 41. The switching circuit 37 interrupts the recording signal from the recording amplifier 36 during intervals corresponding to the pulse widths of the pulses c1 and c2 supplied from the micro-computer 35, and passes and supplies the recording signal to the heads 20A and 20B during other intervals. The heads 20A and 20B assume reproducing states while the application of the recording signal thereto is interrupted according to the pulses c1 and c2, to reproduce the pilot signal recorded on the adjacent track as crosstalk.

During the high-level period of the drum pulse a, the second head 20B makes contact with the tape 10, and during the low-level period of the drum pulse a, the first head 20A makes contact with the tape 10. Accordingly, the second head 20B is in the reproducing state for the duration of the pulse c1, and records the pilot signal together with the recording video signal for the duration of the pulse b1. The first head 20A records the pilot signal together with the recording video signal for the duration of the pulse b2, and assumes the reproducing state for the duration of the pulse c2.

The pilot signals recorded in the adjacent tracks which are reproduced by the heads 20A and 20B, are supplied to the switching circuit 38. The switching circuit 38 is normally in an interrupting state during the recording mode, and assumes a signal passing state to pass the signals from the heads 20A and 20B during intervals corresponding to the widths of the pulses c1 and c2 when supplied with these pulses c1 and c2. The signal which passes through the switching circuit 38 is amplified at a preamplifier 39, and supplied to a bandpass filter 40. Only the frequency component of the pilot signal reproduced as crosstalk is obtained at the bandpass filter 40, and supplied to the switching circuit 41. The switching circuit 41 assumes a signal passing state only during the interval in which the pulses c1 and c2 are applied thereto. Moreover, the switching circuit 41 obtains a signal f shown in FIG. 6(F) according to the pulse c1 and obtains a signal e shown in FIG. 6(E) according to the pulse c2, and supplies these signals to a level detector 42.

The level detector 42 detects the envelopes of the signals e and f, and applies a D.C. voltage detection output to the micro-computer 35. The micro-computer 35 stores the output of the level detector 42, and compares this output with the output obtained during scanning of the previous track. That is, as the pilot signal reproduced as crosstalk which is obtained from the switching circuit 41, there is the signal f which is reproduced from the adjacent track TA1 while the second head 20B records and forms the track TB1, for example, and the signal e which is reproduced from the adjacent track TB1 while the first head 20A records and forms the track TA2 which follows the track TB1. When the level of the signal e is higher than that of the signal f, the rate with which the first head 20A scans over the adjacent track recorded by the second head 20B is higher than the rate with which the second head 20B previously scanned over the adjacent track recorded by the first head 20A. Hence, in this state, the first head 20A is at a height position relatively lower than the height position of the second head 20B. Conversely, when the level of the signal f is higher than that of the signal e, the second head 20B is at a height position relatively lower than the height position of the first head 20. In addition, the level difference between the signals e and f represents the relative shift quantity between the height positions of the first and second heads 20A and 20B.

Hence, the micro-computer 35 produces a control signal for compensating for the shift in the relative height positions of the first and second heads 20A and 20B, from the level difference between the detection outputs of the signals e and f obtained from the level detector 42. This output control signal from the micro-computer 35 is amplified at an amplifier 43, and applied to a head moving mechanism 44 with respect to one of the heads, that is, the head 20A, for example, to control the height position of the head 20A so that the relative height positions of the heads 20A and 20B become the same. In this state, a head moving mechanism (not shown) with respect to the other head 20B is grounded and is put into an inoperative state, and the height position of the head 20B is fixed.

When the recording and reproducing apparatus assumes the reproducing mode, the switching circuit 38 constantly assumes the signal passing state. Thus, the reproduced video signals from the heads 20A and 20B are supplied to a reproduced signal processing circuit 45, through the switching circuit 38 and the preamplifier 39, and are subjected to signal processing so that the reproduced video signals assume the format of the original standard video signal. The reproduced video signal is obtained through an output terminal 46, and supplied to a television receiver. The pilot signal for reproducing mode is multiplexed with the recording video signal and recorded during the recording mode, and the control signal is obtained from the reproduced pilot signal during the reproducing mode. This control signal is applied to the head moving mechanisms with respect to both the heads 20A and 20B, to carry out the tracking control. Detailed description on the tracking control will be omitted, because the tracking control operation is carried out similarly as in the conventional recording and reproducing apparatus.

FIG. 7 shows a block diagram of a circuit system which carries out operations equivalent to those carried out by the micro-computer 35 described heretofore. The drum pulse a applied to the terminal 34, is supplied to monostable multivibrators 50 through 53. The monostable multivibrator 50 produces a high-level pulse during an interval $(Z+0.25H)$ from the rise in the drum pulse a, and the monostable multivibrator 51 produces a high-level pulse during an interval $(Z+1.75H)$ from the fall in the drum pulse a. The output pulses of the monostable multivibrators 50 and 51 are respectively supplied to an OR-gate 54, and an output of the OR-gate is supplied to a monostable multivibrator 55. The monostable multivibrator 55 is triggered by a fall in the pulse applied thereto, and produces pulses c1 and c2 having a pulse width corresponding to an interval 1.25H. These pulses c1 and c2 are supplied to the switching circuits 37, 38, and 41 through a terminal 56. The monostable multivibrator 52 produces a high-level pulse during an interval $(Z+1.5H)$ from the rise in the drum pulse a, and the monostable multivibrator 53 produces a high-level pulse during an interval Z from the fall in the drum pulse a. The output pulses of the monostable multivibrators 52 and 53 are respectively supplied to an OR-gate 57, and an output of the OR-gate 57 is supplied to a monostable multivibrator 58. The monostable multivibrator 58 is triggered by a fall in the pulse applied thereto, and produces pulses b1 and b2 having a pulse width corresponding to an interval 1.25H. These pulses b1 and b2 are supplied to the pilot signal generator 33 through an output terminal 59.

The detected output from the level detector 42 is supplied to a switch 61 through a terminal 60. This switch 61 is applied with the drum pulse a, and is connected to a terminal p during the high-level period of the drum pulse a, and connected to a terminal q during the low-level period of the drum pulse a. A switch 62 connected to the terminal p of the switch 61 closes when applied with the output pulse c1 of the monostable multivibrator 55, and on the other hand, a switch 63 connected to the terminal q of the switch 61 closes when applied with the output pulse c2 of the monostable multivibrator 55. Accordingly, the detected output of the signal f applied to the terminal 60 is supplied to an integrator 64 through the switches 61 and 62, and the detected output of the signal e is supplied to an integrator 65 through the switches 61 and 63.

The output pulses c1 and c2 of the monostable multivibrator 55 are also supplied to a differentiating circuit 66, and the rises in the pulses c1 and c2 are accordingly differentiated. A switch 67 connected to the differentiating circuit 66 is applied with the drum pulse a from the terminal 34, and is connected to a terminal p during the high-level period of the drum pulse a, and connected to a terminal q during the low-level period of the drum pulse a. Hence, the differentiated pulse of the pulse c1 obtained from the differentiating circuit 66 is applied to the integrator 64 through the switch 67, to instantaneously discharge and reset the integrator 64. At the same time, the differentiated pulse of the pulse c2 is applied to the integrator 65 through the switch 67, to discharge and reset the integrator 65. Accordingly, the integrators 64 and 65 respectively integrate the detected outputs of the signals e and f immediately after being reset. Outputs of the integrators 64 and 65 are supplied to a subtracting circuit 68 and subtracted. Thus, the shift quantity in the relative height position of one head with respect to the other head can be determined according to the level and polarity of the output obtained from the subtracting circuit 68. The output of the subtracting circuit 68 is supplied to an integrator 69, and integrated for three to five revolutions of the rotary head, that is, 1/10 to 1/6 second, for example. As a result, a signal corresponding to the scanning error of six to ten tracks is averaged and produced as a control signal from the integrator 69. This control signal is supplied to the amplifier 43 described before, from the output terminal 30. There are hardly any effects due to dropout and the like, by providing the above integrator 69.

The embodiment described heretofore relates to a case where there are two rotary heads, however, the number of rotary heads is not limited to two. For example, in a case where there are three rotary heads, the recording and reproduction of the pilot signal are carried out as indicated by a track pattern shown in FIG. 8. That is, when forming the tracks TA1, TA2, . . . by the first head 20A, the pilot signal is recorded on the track part PA, and the pilot signal previously recorded on the adjacent track is reproduced from the following track part RA. Next, when forming the tracks TB1, TB2, ... by the second head 20B, the pilot signal is recorded on the track part PB, and the pilot signal previously recorded on the adjacent track is reproduced from the following track part RB. In this case, the positions of the track paarts PB and RB are determined so that the track part RB reproduced by the second head 20B is adjacent to the track part PA on the adjacent track which was previously formed by the first head 20A. Furthermore, when a third head 20C forms tracks TC1, TC2, ..., the pilot signal previously recorded on the adjacent track is reproduced from a track part RC, and the pilot signal is then recorded on a track part PC. The positions of the track parts RC and PC are determined so that the track part RC reproduced by the third head 20C is adjacent to the track part PB on the adjacent track which was previously formed by the second head 20B.

If the track pattern is determined so that each track is positioned as described heretofore, the entire reproducing track part becomes adjacent to the pilot signal recorded part of the adjacent track, and the pilot signal recorded on the adjacent track can positively be reproduced as crosstalk.

In a case where there are four rotary heads, the recording and reproduction of the pilot signals are carried out as indicated by a track pattern shown in FIG. 9. When forming the tracks TA1, TA2, ... by the first head 20A, the pilot signal previously recorded on the adjacent track is reproduced from the track part RA, and the pilot signal is recorded on the following track part PA. Next, when forming the tracks TB1, TB2, ... by the second head 20B, the pilot signal is recorded on the track part PB, and the pilot signal previously recorded on the adjacent track is then reproduced from the track part RB. When forming the tracks TC1, TC2, ... by the third head 20C, the pilot signal previously recorded on the adjacent track is reproduced from the track part RC, and the pilot signal is recorded on the following track part PC. Next, when forming tracks TD1, TD2, ... by a fourth head 20D, the pilot signal is recorded on a track part PD, and the pilot signal previously recorded on the adjacent track is then reproduced from a track part RD. In this case, each of the track parts are positioned so that the track parts RB, RC, RD, and RA become perfectly adjacent to the pilot signal recorded track parts PA, PB, PC, and PD on the respective adjacent tracks.

Next, description will be given with respect to still another embodiment of a system according to the present invention, by referring to FIG. 10. In FIG. 10, when the first head 20A forms the track TA1, the first head 20A records the pilot signal from a position separated by a distance corresponding to a predetermined distance Z from the starting end of the track, for an interval 0.25H equal to the H-shift quantity of the track. Then, the head 20A carries out reproduction for an interval 0.25H, and thereafter, the head 20A again records the pilot signal for an interval 0.25H, and again carries out reproduction for an interval 0.25H. The head 20A repeats this recording of the pilot signal for the interval 0.25H and the reproduction for the succeeding interval 0.25H, for a total of four times. As a result, pilot signal recorded track parts PA1 through PA4 and reproducing track parts RA1 through RA4 alternately exist on the track TA1.

When the second head 20B forms the track TB1, the second head 20B records the pilot signal from a position separated by a distance corresponding to a predetermined distance Z from the starting end of the track, for an interval 0.25H. Then, the head 20B carries out reproduction for an interval 0.25H, and thereafter, the head 20B again records the pilot signal for an interval 0.25H, and again carries out reproduction for an interval 0.25H. The head 20B repeats this recording of the pilot signal for the interval 0.25H and the reproduction for the succeeding interval 0.25H, for a total of four times. As a result, pilot signal recorded track parts PB1 through PB4 and reproducing track parts RB1 through RB4 alternately exist on the track TB1.

Similarly thereafter, the heads 20A and 20B alternately form tracks. Each of the reproducing track parts of each of the tracks, is adjacent to each of the respective pilot signal recorded parts of the adjacent track, and there are four reproducing track parts on on track. Hence, although the interval of one reproducing track part is 0.25H, there is in reality a reproducing track part having an interval 1H on one track. Therefore, it is possible to positively reproduce the pilot signal recorded on the adjacent track as crosstalk.

The length of one recording track part is not limited to 0.25H, and the length of the recording track part may be varied according to the H-shift quantity, as long as the length of the reproducing track part is equal to the H-shift quantity. In addition, the number of pairs of pilot signal recorded track part and the reproducing track part is not limited to four, and may be any plurality of pairs.

Figure 11:
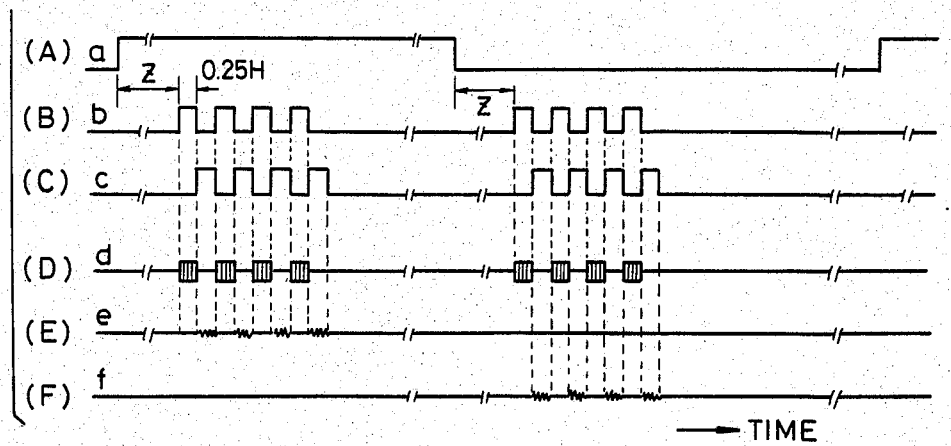
FIGS. 11(A) through 11(F) are graphs respectively showing signal waveforms at each part of a block system shown in FIG. 5 for realizing the fourth embodiment of the system according to the present invention.
Figure 12:
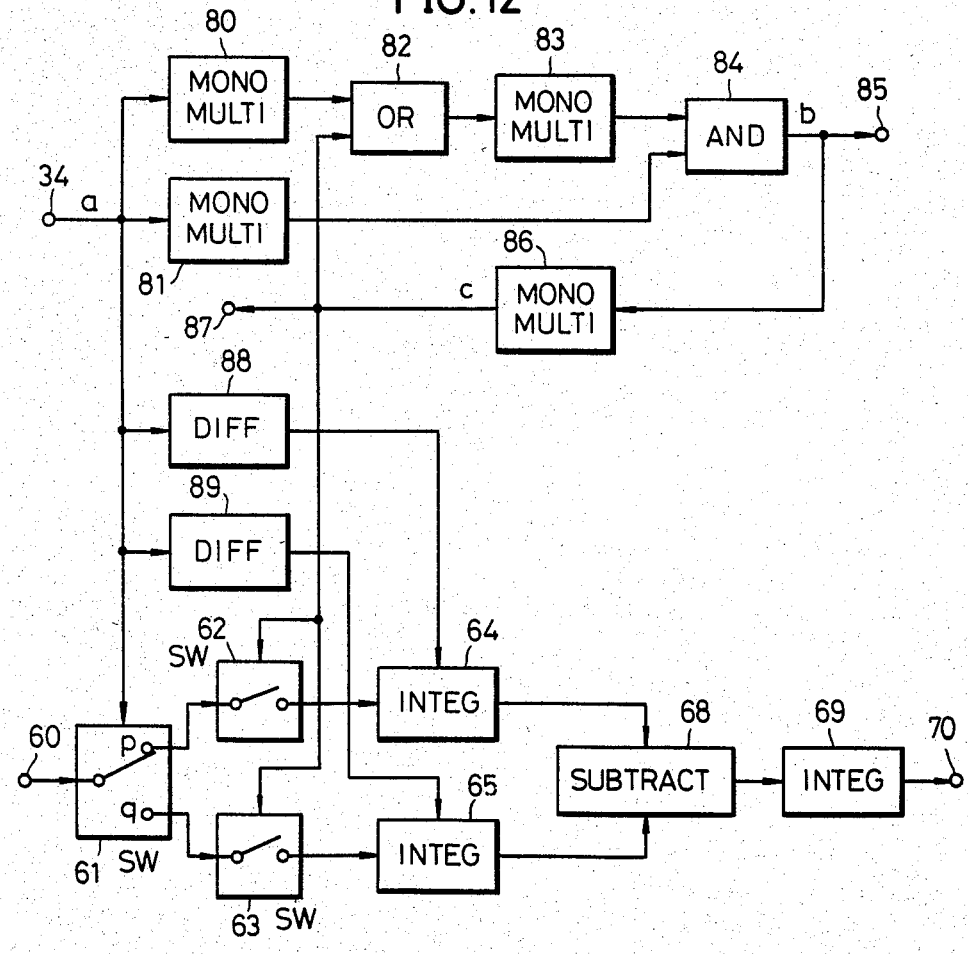
FIG. 12 is a diagram for explaining the operations of a micro-computer shown in FIG. 5 for realizing the fourth embodiment of the system according to the present invention, by replacing the operations of the micro-computer by equivalent block systems.

The above described recording and reproducing operations may be carried out by the previously described block system shown in FIG. 5. However, in the present embodiment, the operations of the micro-computer 35 is different from those carried out in the first embodiment described before. Hence, the operations of the micro-computer 35 for the present embodiment will now be described in conjunction with FIGS. 11 and 12.

A drum pulse a shown in FIG. 11(A) (the same as the drum pulse a shown in FIG. 6(A)) applied to the terminal 34, is supplied to monostable multivibrators 80 and 81. The monostable multivibrator 80 produces a pulse having a pulse width corresponding to the interval Z, from the rise and fall in the drum pulse a. On the other hand, the monostable multivibrator 81 produces a pulse having a pulse width corresponding to an interval (Z+1.75H) to (Z+2H), from the rise and fall in the drum pulse a. The output of the monostable multivibrator 81 is supplied to an AND-gate 84. The output of the monostable multivibrator 80 is applied to a monostable multivibrator 83 through an OR-gate 82, to trigger the monostable multivibrator 83. The monostable multivibrator 83 produces a pulse having a pulse width 0.25H when triggered. The output of the monostable multivibrator 83 is applied to a monostable multivibrator 86 through the AND-gate 84. The monostable multivibrator 86 is triggered by a fall in the output pulse of the monostable multivibrator 83, and produces a pulse having a pulse width 0.25H. The output of the monostable multivibrator 86 is supplied to the monostable multivibrator 83 through the OR-gate 82, and the monostable multivibrator 83 is triggered by a fall in the output of the monostable multivibrator 86. The above described operations are continuously carried out while the signal applied to the AND-gate 84 from the monostable multivibrator 81 exists.

Accordingly, an output pulse of the monostable multivibrator 83 comprising four pulses as shown in FIG. 11(B) is obtained through an output terminal 85 as a pulse b, and supplied to the pilot signal generator 33 shown in FIG. 5. In addition, an output pulse of the monostable multivibrator 86 comprising four pulses as shown in FIG. 11(C) is obtained through an output terminal 87 as a pulse c, and supplied to the switching circuits 37, 38, and 41 shown in FIG. 5. The pilot signal generator 33 generates a pilot signal d shown in FIG. 11(D) when applied with the pulse b from the output terminal 85. The switching circuit 37 interrupts the recording signal every time the pulse c is applied thereto, and the switching circuit 38 passes the reproduced signal every time the pulse c is applied thereto. Hence, the pilot signal is recorded with intervals of 0.25H in accordance with the pulse b, and the pilot signal recorded on the adjacent track is reproduced as crosstalk with different intervals of 0.25H. Therefore, signals e and f shown in FIGS. 11(E) and 11(F) are obtained from the switching circuit 51 shown in FIG. 5, and supplied to the level detector 42.

The detected output of the level detector 42 is supplied to the switch 61 through the terminal 60. This switch 61 is applied with the drum pulse a, and is connected to the terminal p during the high-level period of the drum pulse a, and connected to the terminal q during the low-level period of the drum pulse a. The switch 62 connected to the terminal p of the switch 61 and the switch 63 connected to the terminal q of the switch 61 close when applied with the output pulse c of the monostable multivibrator 86. Accordingly, the detected output of the signal e applied to the terminal 60 is supplied to the integrator 64 through the switches 61 and 62, and the detected output of the signal f is supplied to the integrator 65 through the switches 61 and 63.

The drum pulse a obtained through the terminal 34 is also supplied to differentiating circuits 88 and 89 wherein rises and falls in the drum pulse a are respectively differentiated. Output differentiated pulses of the differentiating circuits 88 and 89 are applied to the integrators 64 and 65, respectively, to discharge and reset the integrators 64 and 65. Thus, the integrators 64 and 65 respectively integrate the detected outputs of the signals e and f after being reset. The operations carried out thereafter are the same as those carried out in the embodiment described before in conjunction with FIG. 7, and those blocks which are the same as those blocks shown in FIG. 7 are designated by the same reference numerals and their description will be omitted.

Further, the present invention is not limited to these embodiments, but various variations and modifications may be made without departing from the scope of the present invention.

What is claimed is:

1. A rotary magnetic head scanning control system in a magnetic tape recording and reproducing apparatus comprising a plurality of rotary magnetic heads which record signals during a recording mode while forming tracks which are oblique to the longitudinal direction of said magnetic tape and which reproduce recorded signals from said tracks during a reproducing mode, and head height position control means operated responsive to a control signal for controlling the height positions of each of said rotary magnetic heads, said system comprising:

pilot signal generating means for generating a single pilot signal having a single frequency during said recording mode;

means for controlling an interruption and an application of the single pilot signal and of an information signal including at least a video signal to each of said rotary magnetic heads, the single pilot signal being supplied to one of said rotary magnetic heads together with said information signal during a first predetermined time period to cause said one rotary magnetic head to record the single pilot signal and the information signal on the same track, and the application of the information signal to said one rotary magnetic head being thereafter interrupted during a first specific time period to put said one rotary magnetic head into a reproducing state, and the application of the information signal to the other of said rotary magnetic heads being interrupted during a second specific time period in which said other rotary magnetic head scans over a part of a track which is adjacent to a part of the track which is formed by said one rotary magnetic head and on which the single pilot signal is recorded in order to put said other rotary magnetic head in a reproducing state, and the single pilot signal thereafter being supplied to said other rotary magnetic head together with said information signal during a second predetermined time period to cause said other rotary magnetic head to record the single pilot signal and the information signal, each of said rotary magnetic heads reproducing as crosstalk a pilot signal which is recorded on a part of a track which is adjacent to a track which is actually being scanned by a rotary magnetic head, said one rotary magnetic head and said other rotary magnetic head recording said single pilot signal during the respective first and second predetermined periods, each of said predetermined periods corresponding to a few horizontal scanning periods of the video signal, and said one rotary magnetic head and said other rotary magnetic head assuming a reproducing state for the respective first and second specific periods, each of said specific periods existing within a vertical blanking period which is separated in the longitudinal direction of the track by at least two or more horizontal scanning periods from a part of the track where a vertical synchronizing signal of the video signal is recorded; and means responsive to a reproduction of said crosstalk for forming said control signal from the single pilot signal, means for applying said control signal to said head height position control means to bring each of said rotary magnetic heads to the same height position.

2. The rotary magnetic head scanning control system as claimed in claim 1 in which said plurality of rotary magnetic heads are a pair of rotary magnetic heads which alternately form the tracks, a first of said pair of rotary magnetic heads assuming a recording state for recording the single pilot signal during a predetermined time period while forming one track and thereafter assuming a reproducing state during a specific time period, a second of said pair of rotary magnetic heads assuming a reproducing state during a specific time period while forming another track and thereafter recording the pilot single signal during a predetermined time period, said first rotary magnetic head assuming the reproducing state while scanning over a part of a track which is adjacent to a part of a track which is formed by said second rotary magnetic head and on which the pilot signal is recorded, and said second rotary magnetic head assuming the reproducing state while scanning over a part of a track which is adjacent to a part of a track which is formed by said first rotary magnetic head and on which the single pilot signal is recorded.

3. The rotary magnetic head scanning control system as claimed in claim 1 in which said plurality of rotary magnetic heads are three rotary magnetic heads which successively record and form the tracks, a first of said rotary magnetic heads recording the single pilot signal during a predetermined time period and thereafter assuming a reproducing state, a second of said rotary magnetic heads recording the single pilot signal during a predetermined time period and thereafter assuming a reproducing state for a specific period while scanning over a part of a track which is adjacent to a part of a track which is formed by said first rotary magnetic head and which has the single pilot signal recorded thereon, a third rotary magnetic head assuming a reproducing state during a specific time period while scanning over a part of a track which is adjacent to a part of a track which is formed by said second rotary magnetic head and which has the single pilot signal recorded thereon, and thereafter recording the single pilot signal during a predetermined time period, and said first rotary magnetic head assuming a reproducing state during a specific time period while scanning over a part of a track which is adjacent to a part of a track which is formed by said third rotary magnetic head and which has the pilot signal recorded thereon.

4. A rotary magnetic head scanning control system as claimed in claim 1 in which said plurality of rotary magnetic heads are four rotary magnetic heads which successively record and form the tracks, a first rotary magnetic head assuming a reproducing state during a specific time period and thereafter recording the single pilot signal during a predetermined time period, a second rotary magnetic head recording the single pilot signal during a predetermined time period and thereafter assuming a reproducing state during a specific time period while scanning over a part of a track which is adjacent to a part of a track which is formed by said first rotary magnetic head and which has the single pilot signal recorded thereon, a third rotary magnetic head assuming a reproducing state during a specific time period while scanning over a part of a track which is adjacent to a part of a track which is formed by said second rotary magnetic head and which has the single pilot signal recorded thereon, and thereafter recording the single pilot signal during a predetermined time period, a fourth rotary magnetic head recording the single pilot signal during a predetermined time period and thereafter assuming a reproducing state during a specific time period while scanning over a part of a track which is adjacent to a part of a track which is formed by said third rotary magnetic head and which has the single pilot signal recorded thereon, and said first rotary magnetic head assuming a reproducing state for a specific period while scanning over a part of a track which is adjacent to a part of a track which is formed by said fourth rotary magnetic head and which has the single pilot signal recorded thereon.

5. A rotary magnetic head scanning control system as claimed in claim 1 in which said plurality of rotary magnetic heads are first and second rotary magnetic heads which alternately form the tracks, each of said first and second rotary magnetic heads respectively repeatedly assuming a recording state for recording the single pilot signal during a predetermined time period and a reproducing state during a specific time period thereafter for a plurality of times while forming respective tracks, said first rotary magnetic head assuming the reproducing state while scanning over each part of a track which is adjacent to each corresponding part of a track which is formed by the said second rotary magnetic head, and said second rotary magnetic head assuming a reproducing state while scanning over each part of a track which is adjacent to each corresponding part of a track which is formed by said first rotary magnetic head and which has the single pilot signal recorded thereon.

6. A rotary magnetic head scanning control system as claimed in claim 2 in which said first rotary magnetic head records said single pilot signal from a position which is separated in a longitudinal direction along a track by a specific distance Z from a starting end of a track, and said second rotary magentic head assuming the reproducing state from a position which is separated by a distance $(Z+Q)$ from a starting end of a track, where Q represents a shift in horizontal synchronizing signals of the video signal recorded on mutually adjacent tracks which are formed by said first and second rotary magentic heads.

* * * * *